United States Patent
Zhang et al.

(10) Patent No.: US 7,860,019 B2
(45) Date of Patent: Dec. 28, 2010

(54) PEER-TO-PEER NETWORK AND USER INFORMATION DISCOVERY AND SHARING FOR MOBILE USERS AND DEVICES

(75) Inventors: Tao Zhang, Fort Lee, NJ (US); Eric Van Den Berg, Hoboken, NJ (US); Sunil Madhani, Austin, TX (US)

(73) Assignees: Toshiba America Research, Inc., Piscataway, NJ (US); Telcordia Technologies, Inc., Piscataway, NJ (US)

( * ) Notice: Subject to any disclaimer, the term of this patent is extended or adjusted under 35 U.S.C. 154(b) by 673 days.

(21) Appl. No.: 11/161,298

(22) Filed: Jul. 28, 2005

(65) Prior Publication Data

US 2006/0098588 A1 May 11, 2006

Related U.S. Application Data

(60) Provisional application No. 60/625,106, filed on Nov. 5, 2004, provisional application No. 60/593,377, filed on Jan. 9, 2005.

(51) Int. Cl.
*H04L 12/26* (2006.01)

(52) U.S. Cl. ............... 370/252; 370/254; 370/328; 370/338

(58) Field of Classification Search .......... None
See application file for complete search history.

(56) References Cited

U.S. PATENT DOCUMENTS

| | | | |
|---|---|---|---|
| 6,970,444 B2 * | 11/2005 | Chwieseni et al. | 370/338 |
| 7,103,333 B2 * | 9/2006 | Lazaridis et al. | 455/412.1 |
| 7,327,683 B2 * | 2/2008 | Ogier et al. | 370/236 |
| 7,328,243 B2 * | 2/2008 | Yeager et al. | 709/205 |
| 7,342,928 B2 * | 3/2008 | Boulay et al. | 370/395.2 |
| 7,349,360 B2 * | 3/2008 | Gutierrez et al. | 370/315 |
| 7,369,861 B2 * | 5/2008 | Vare | 455/456.2 |
| 7,489,653 B2 * | 2/2009 | Zhang et al. | 370/328 |
| 7,548,758 B2 * | 6/2009 | Periyalwar et al. | 455/517 |
| 2004/0088646 A1 | 5/2004 | Yeager et al. | |
| 2004/0125776 A1 * | 7/2004 | Haugli et al. | 370/338 |
| 2005/0135286 A1 * | 6/2005 | Nurminen et al. | 370/310 |
| 2006/0087999 A1 * | 4/2006 | Gustave et al. | 370/328 |
| 2006/0094456 A1 * | 5/2006 | Rittle et al. | 455/519 |

OTHER PUBLICATIONS

M. Liebsch, Candidate Access Router Discovery, Dec. 2003, p. 1-31, Internet Draft, USA.
K. Arabshian, GloServ: Global Service Discovery Architecture, Aug. 22, 2004, p. 319-325, USA.
Frank Manola, Resource Description Framework, Feb. 10, 2004, p. 1-112, USA.
Martin Gudgin, SOAP: Simple Object Access Protocol, Apr. 27, 2007, p. 1-53, USA.
International Search Report and Written Opinion dated Jul. 7, 2008.

* cited by examiner

*Primary Examiner*—Michael J Moore, Jr.
(74) *Attorney, Agent, or Firm*—Watchstone P&D, PLLC (57) ABSTRACT

Systems and methods for mobile peer-to-peer information sharing are disclosed. With the preferred systems and methods, mobile users and devices collect information about networks that they visit, and carry that information as they move to new networks. Mobile users and/or devices then share such information directly with each other.

30 Claims, 4 Drawing Sheets

PEER-TO-PEER NETWORK AND USER INFORMATION DISCOVERY AND SHARING FOR MOBILE USERS AND DEVICES

BACKGROUND

1. Field of the Invention

The present application relates to, inter alia, methods for peer-to-peer network and information discovery systems and methods. The entire disclosures of each of the following co-pending provisional patent applications of the present assignees are incorporated herein by reference: (1) U.S. Provisional Patent Application Ser. No. 60/625,106 entitled Network Discovery Mechanisms filed on Nov. 5, 2004; (2) U.S. Provisional Patent Application Ser. No. 60/593,377 entitled Network Discovery Mechanisms filed on Jan. 9, 2005; and (3) U.S. Provisional Patent Application Ser. No. 60/670,655 entitled Network Discovery Mechanisms filed on Apr. 13, 2005.

2. Background Discussion

General Background Discussion:

Networks and Internet Protocol

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

With respect to IP (Internet Protocol), this is a protocol by which data can be sent from one device (e.g., a phone, a PDA [Personal Digital Assistant], a computer, etc.) to another device on a network. There are a variety of versions of IP today, including, e.g., IPv4, IPv6, etc. Each host device on the network has at least one IP address that identifies the host device's point of attachment to the IP networks.

IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. In the OSI and other similar models, IP is in Layer-3, the network layer.

Wireless Networks

Wireless networks can incorporate various types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, e.g., a single chip transceiver with an integrated transmitter, receiver and, if desired, other functions); an antenna; a processor; one or more audio transducers (for example, a speaker or a microphone as in devices for audio communications); electromagnetic data storage (such as, e.g., ROM, RAM, digital data storage, etc., such as in devices where data processing is provided); memory; flash memory; a full chip set or integrated circuit; interfaces (such as, e.g., USB, CODEC, UART, PCM, etc.); and/or the like.

Wireless LANs (WLANs) in which a mobile user can connect to a local area network (LAN) through a wireless connection may be employed for wireless communications. Wireless communications can include, e.g., communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB: RFCs are formal documents of the Internet Engineering Task Force (IETF). Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

In basic IP routing (i.e. outside mobile IP), typically, routing mechanisms rely on the assumptions that each network node always has a constant attachment point to, e.g., the Internet and that each node's IP address identifies the network link it is attached to. In this document, the terminology "node" includes a connection point, which can include, e.g., a redistribution point or an end point for data transmissions, and which can recognize, process and/or forward communications to other nodes. For example, Internet routers can look at, e.g., an IP address prefix or the like identifying a device's network. Then, at a network level, routers can look at, e.g., a set of bits identifying a particular subnet. Then, at a subnet level, routers can look at, e.g., a set of bits identifying a particular device. With typical mobile IP communications, if a user disconnects a mobile device from, e.g., the Internet and tries to reconnect it at a new subnet, then the device has to be reconfigured with a new IP address, a proper netmask and a default router. Otherwise, routing protocols would not be able to deliver the packets properly.

Network and Information Discovery

In the evolution of wireless networking based on, e.g., wireless LAN (Local Area Network) and cellular technologies, and as mobility services prevail and people become increasingly mobile, it is increasingly important for a mobile device to be able to find an appropriate point of network attachment that meets the application requirements and the characteristics of the mobile, in a timely, accurate and efficient manner. By way of example, such network discovery can relate to, e.g., the discovery of information that the mobile station uses to access a network, such as, by way of example, a network attachment point identification (e.g., an L2 address and/or a geographical address of an access point), a MAC type (e.g., "IEEE 802.11g") of an access point, a security type (e.g., "WPA" or "PANA and IPsec") supported by an access point, a layer-3 type (e.g., "IPv4 only" or "IPv4/v6 dual stack"), a provider name, or the addresses of a server or an agent (e.g., PANA authentication agents, access routers, SIP servers and Mobile IP home agents).

Additionally, mobile users and their mobile devices (e.g., mobile phones, Personal Digital Assistants, notebook computers, on-vehicle networking devices and/or the like) need to discover a growing range of information as they travel across potentially heterogeneous radio networks. This information includes, e.g.:

User-interest information (i.e., information of interest to human users): Examples include the existence and/or locations, etc., of: a) local networks (such as, e.g., public hotspot networks and/or the like); b) network services (such as, e.g., voice-over-IP services and/or the like); c) networked devices (such as, e.g., printers, displays, disks and/or the like); d) applications and/or software utilities; e) location-sensitive information, application contents, dynamically changing information (such as, e.g., news information, local area information, information regarding traffic accidents and/or road conditions and/or the like) and/or the like, which are in the current and/or neighboring networks. In the preferred examples, a neighboring network includes a nearby network that a mobile device or user can move into (such as, e.g., a subsequent or next network from its current network). Depending on circumstances, a neighboring network's radio coverage area may or may not overlap with a radio coverage area of the mobile device's or user's current network.

Device-interest information: Emerging mobile devices often need information, which human users may or may not be interested in, regarding neighboring networks to better support mobility and mobile applications. For example, to reduce handoff delay and interruptions to on-going user applications during handoff, a mobile device can perform pre-handoff processing, before it starts the handoff into a target network. For example, a mobile device may acquire a local IP address from, and even authenticate with, the target network when the mobile is still using its current network to transport user application traffic even before the mobile detects the radio signals from the target network. To do so, the mobile device needs to know, e.g., the IP address of the IP address server (e.g., the Dynamic Host Configuration Protocol or DHCP server) and the authentication server in the target network before it starts handoff to the target network. See, e.g., device-interest information discussed in the above-referenced co-pending provisional applications entitled Network Discovery Mechanisms incorporated herein by reference above.

In this document, mobile users and mobile devices may be referred to generally as "mobiles" in, e.g., contexts where there is no need to distinguish between a human user and a device.

Several frameworks and protocols are available for discovering network services and devices, which have been referred to as service discovery approaches. See, e.g., the below references [1], [2], [3] and [5], incorporated herein by reference. Examples of services include, by way of example: shared network devices such as, e.g., printers, displays and/or disks; software utilities; information such as, e.g., databases and files; and/or the like. The leading service discovery frameworks include Jini (see reference [1] below), (see reference UPnP [2] above), and Salutation (see reference [3] below).

These services were described in the above co-pending provisional applications entitled Network Discovery Mechanisms, incorporated herein by reference above and are discussed in the following paragraphs.

First, Jini allows devices and software components to form a dynamic distributed network system. It provides mechanisms for service construction, lookup, communication, and use in a distributed system. All services are registered with a central register. Clients locate services using a directory service referred to as the lookup service.

Second, Salutation provides a method for applications, services and devices to describe and advertise their capabilities, and to find other applications, services and devices. The Salutation architecture has two major components: Salutation Manager and Transport Manager. Salutation Manager is a service broker. Each service provider registers its capability with a Salutation Manager. A client queries a Solution Manager to find a service, and the Salutation Managers coordinate with each other to locate the service for the client. The Transport Manager provides reliable transport of Solution messages.

Third, the Universal Plug and Play (UPnP) is architecture for dynamically establishing peer-to-peer network connectivity among user devices. It provides capabilities for devices to dynamically join a network, obtain an IP address, convey its capabilities upon request, and learn about the presence and capabilities of other devices. UPnP does not use central service registry.

These existing service discovery mechanisms focus on discovering existing network services and devices. Among other deficiencies, they cannot support the discovery of dynamic information, such as changing traffic conditions, accidents, and/or other dynamically changing information. They allow a device to discover only other devices, services, or applications that implement the same service discovery platform. For example, an UPnP device may not be able to discover an IP router or a piece of network information or user content that is not implemented based on UPnP. Furthermore, existing service discovery methods do not support "neighborhood discovery"—e.g., discovering information regarding neighboring networks and location-based information, such as, e.g.: the existence and/or locations of neighboring networks; addresses of the DHCP servers, authentication servers, and SIP servers in a neighboring network; and/or other location-based network information and user content available in the neighboring networks.

Recently, an autonomous collaborative discovery approach was proposed by the present inventors, see item [6] below, to support real-time discovery of user and network information including location-sensitive information, dynamic information (e.g., traffic conditions), and neighboring networks (e.g., existence and locations of neighboring networks, and addresses of key network elements such as access routers and authentication servers in neighboring networks). In this approach, mobile users and their mobile devices act as scouts to collect user and network information as part of their routine use of each network. They then make the information available on a knowledge server, which can be independent of network providers, to be shared by all subscribing mobile users and devices of the knowledge server.

Recognizing that existing service discovery approaches lack the ability to support neighborhood discovery, the Internet Engineering Task Force (IETF) has been developing a Candidate Access Router Discovery (CARD) protocol (see reference [4] below) that allows user devices to discover the IP address and capabilities of access routers in neighboring networks. CARD, however, has a number of limitations, including:
  It requires neighboring access routers to use the CARD protocol to dynamically exchange network information, which is difficult when neighboring networks belong to different network providers.
  It requires all access routers to implement the CARD protocol to communicate with mobile users, which is a difficult proposition.
  A mobile device can only obtain the information a local network provider configures its CARD protocol to provide. Thus, the available information can vary significantly from network to network. This is unsuitable to support mobile devices that may need different information depending on their different networking capabilities and user applications.

Figure 1:
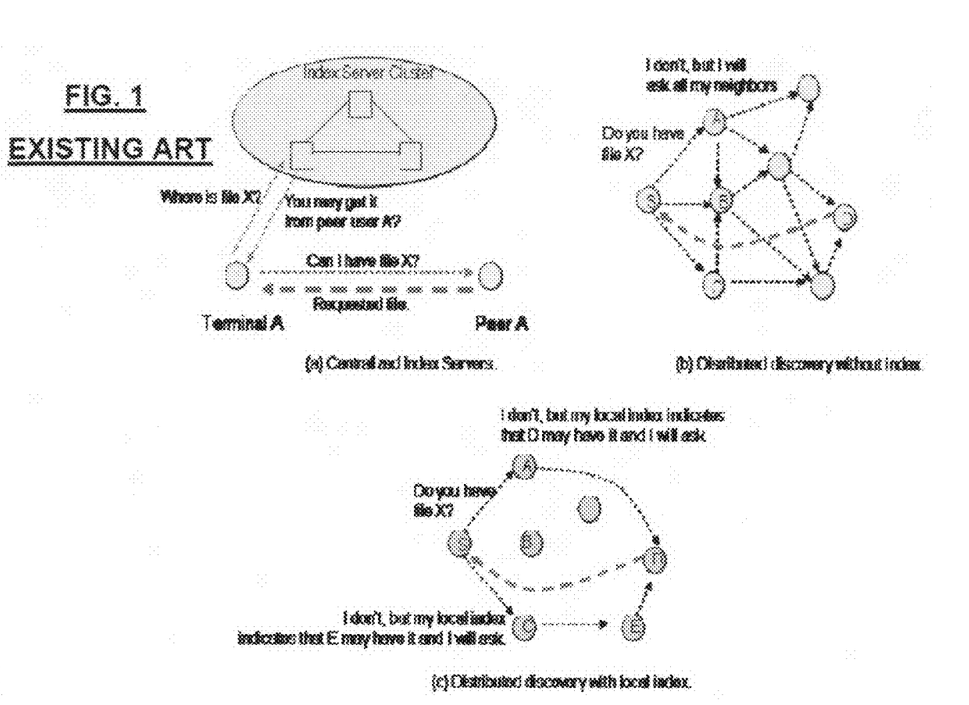
FIG. 1 is a schematic architectural diagram depicting existing peer-to-peer file sharing methods.

Recently, peer-to-peer file sharing over the Internet has been growing rapidly. With reference to FIG. 1, existing peer-to-peer file sharing mechanisms can be classified into the following categories, depending on the techniques used in discovering the files:
  Approaches using centralized index server clusters: These approaches use centralized index server clusters to maintain up-to-date indexes that indicate which end devices have which popular files. When a user wants a file, it first queries an index server to find out which peers may have the requested file. Then, the user can go to the peers directly to get the file. By way of example, this type of method is used by the popular music file sharing system Napster (see, e.g., references [10], [11] and [12] below).
  Approaches using no index: These approaches do not maintain any index. Instead, they rely on flooding for a user to find the files that the user wants. For example, Gnutella ((see, e.g., references [10], [11] and [12] below) is a peer-to-peer file sharing system using such methods. When a user wants a file, the user sends a request to all of its neighbors. Each neighbor will, in turn, forward the request to its own neighbors. Each node with the requested file sends the file to the request originator. The scope of the search is typically controlled by the number of hops that the request can be forwarded.
  Approaches using local indexes: Each user maintains its local index pointing to the locations of frequently requested files. For example, Freenet (see, e.g., references [10] and [11] below) is a file sharing system that uses local indexes. When a node receives a request for a file, it searches its local index first to see if it knows where the requested file is located. If it knows the locations, it forwards the request to only those locations. This reduces the query traffic volume over the networks.

Existing peer-to-peer file sharing methods are not designed for sharing information in a highly time-sensitive manner (such as, e.g., information about neighboring networks), which is important for mobile users/devices, especially for in-vehicle networking devices (e.g., networking devices fixedly mounted within a vehicle, such as, e.g., related to navigation and/or information systems and/or other systems). Furthermore, they are not designed for network neighborhood discovery.

The preferred embodiments improve upon technologies described, e.g., in the following information, each of which is incorporated herein by reference in its entirety:

[1] Sun Microsystems Inc., sun.com/jini/;

[2] Microsoft Corporation, "Universal Plug and Play Device Architecture", upnp.org/;

[3] Salutation Consortium, "Salutation Architecture Specification", Jun. 1, 1999, salutation.org/;

[4] Marco Liebsch and Ajoy Singh (editors), "Candidate Access Router Discovery", Internet Draft draft-ietf-seamoby-card-protocol-06.txt, Internet Engineering Task Force, June 2004;

[5] K. Arabshian, H. Schulzrinne, "GloServ: Global Service Discovery Architecture", Mobiquitous 2004, Boston;

[6] T. Zhang, S. Madhani, E. van den Berg, "AC-CDS Autonomous Collaborative Collection, Discovery, and Sharing of User and Network Information", International Conference on Information Technology: Research and Education (ITRE), Hsinchu Taiwan, Jun. 28, 2005;

[7] Resource Description Framework, w3.org/TR/rdf-primer;

[8] SOAP, Simple Object Access Protocol, w3.org/TR/soap12;

[9] P. Flajolet, D. Gardy, L. Thimonier, "Birthday Paradox, Coupon Collectors, Caching Algorithms and Self-Organizing Search", Discrete Applied Mathematics 39, pp. 207-229, 1992;

[10] A. Creapo, H. Garcia-Molina, "Routing Indices for Peer-to-Peer Systems;"

[11] A. Saroiu, P. K. Gummadi, S. D. Gribble, "A Measurement Study of Peer-to-Peer Sharing Systems;"

[12] napster.com;

[13] gnutella.wego.com;

[14] freetnet.sourceforge.com.

SUMMARY OF THE INVENTION

The present invention improves upon the above and/or other background technologies.

According to some of the preferred embodiments, a novel mobile peer-to-peer information sharing (hereinafter referred to with the acronym MP2P-IS) method is employed that addresses the real-time information discovery needs of mobile users and their devices. In some preferred embodiments, MP2P-IS has at least some, preferably all, of the following characteristics:

The ability to discover and share information about neighboring networks, in a highly timely manner;
  The use of application-centric approaches that allow mobiles to discover information they want, rather than merely what network providers think they may need;
  The ability to discover dynamically changing information;
  The existence of no or virtually no dependency on local networks, except for transporting user packets; and/or
  The support of heterogeneous radio systems (such as, e.g., those which may belong to competing network providers who may not be motivated or may not have established the necessary agreements to share network information with each other).

In some preferred embodiments, neighborhood discovery is used as an example to describe MP2P-IS. In some illustrative embodiments, mobile users may include pedestrians (such as, e.g., carrying mobile devices or the like) or people in moving vehicles (such as, e.g., being transported with mobile devices or the like). In various embodiments, mobile devices can involve in-vehicle networking devices, handheld devices, mobile sensors such as sensors on moving vehicles or carried on people, and/or any other now or later known or developed mobile devices.

According to some illustrative embodiments, a method of network neighborhood discovery of neighboring-network and location-based information using mobile peer-to-peer information sharing includes: a) having a plurality of mobiles each collect network and location-based information regarding networks that it uses; b) having each of the mobiles maintain the information for a finite period even after it leaves a network for which the information is collected; c) having a first mobile of the plurality of mobiles transmit a request for neighboring-network information or location-based information to peer mobiles of the first mobile; and d) having at least one of the peer mobiles transmit at least some of the requested information to the first mobile based on the information collected by the at least one of the peer mobiles. In some embodiments, the location-based information includes dynamically changing user content information available in neighboring networks and/or or dynamic events that the mobile devices or their users can observe.

According to other illustrative embodiments, a method for mobile peer-to-peer information sharing includes: a) having a plurality of mobile devices each collect information regarding networks that it uses; b) having each of the mobile devices maintain the information even after it leaves a network for which such information is collected; c) transmitting a request for neighboring-network information regarding neighboring networks from a first of the plurality of mobile devices to a set of first contact peers of the plurality of mobile devices; d) determining if the set of first contact peers is sufficient for obtaining the neighboring-network information regarding neighboring networks; e) if a determination is that the set of first contact peers are insufficient, transmitting a request for neighboring-network information regarding neighboring networks from the first of the plurality of mobile devices to a set of extended peers of the plurality of mobile devices. In some preferred embodiments, the information regarding networks that the mobile devices used includes device-interest information and/or user-interest information.

In some embodiments, the method includes having the set of first contact peers include peers that are in the first mobile device's current IP sub-network. In some embodiments, the method includes having the plurality of mobile devices each maintain a list of extended peers, and having the first mobile device transmit messages to the extended peers' contact addresses, such as, e.g., the extended peers' unicast IP addresses. In some preferred embodiments, the extended peers include peers that the mobile got to know in a previous network, and preferably the mobile devices retain each extended peer for a finite lifetime which is based on a time period or on a network location.

According to the preferred embodiments, mobiles share information in a peer-to-peer manner without requiring that the peers have direct radio connectivity with one another. On the other hand, according to the preferred embodiments, peer-to-peer sharing of information among mobiles is performed in a manner such that mobiles can be peers of one another regardless of whether or not they have direct radio connectivity with one another.

Furthermore, according to the preferred embodiments, peer mobiles can use any combination of different radio access technologies and can be interconnected via an IP network. By way of example, in the preferred embodiments, a mobile with a WiFi radio can be a peer with a mobile with a CDMA2000 radio as long as, for example, they both can transmit and receive IP packets to each other (such as, e.g., via an IP network interconnecting the WiFi and the CDMA2000 radio access networks). Moreover, even in circumstances where a plurality of mobile peers use the same type of radio technology, they do not necessarily have to have direct radio connectivity with each other. By way of example, the mobiles can each be connected to, e.g., a radio access point and can communicate with one another through the access point.

In this disclosure, in various embodiments, a transmission from a first peer to a second peer can be direct or indirect. In addition, in various embodiments, transmissions can involve transmissions over wireless and/or wired communication media. For illustrative purposes, in some embodiments, a first peer can send a wireless transmission to a radio access point that may, in turn, send a wired transmission destined for another peer (e.g., directly or indirectly destined for the other peer).

In the preferred embodiments, the transmission of communications between peers, whether direct or indirect, is performed in substantially real time, without substantial delay imposed by intermediate system or network components, such as, e.g., radio access points. However, in some embodiments, intermediate system or network components could potentially impose some delay in the transmission of communications, such as, e.g., by storing data received from peers and sending a modified transmission to a requesting mobile based on transmission(s) received from one or more peer (such as, e.g., transmitting a message aggregating information from a plurality of peers).

In addition, it is contemplated that in some embodiments, a mobile can be connected to and/or disconnected to a variety of networks over time and that such connections can include wireless connections and/or wired connections in various embodiments. By way of example, a mobile may send and receive wireless signals in acquiring information from one network, and may then potentially be moved to a new network where it is attached via a wired connection.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which.

DISCUSSION OF THE PREFERRED EMBODIMENTS

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

INTRODUCTORY DISCUSSION

In modern networking environments, mobile users and their devices need to discover a growing range of information. Users may want to know, for example, the existence and locations of surrounding networks and the local services and application contents available on these networks. Emerging mobile devices, especially networking devices on moving vehicles (such as, e.g., vehicle mounted computer devices, navigation systems, information systems, etc.), may need to know information about neighboring networks so that they can, for example, acquire a local IP address from, and authenticate with, a neighboring network before an actual handoff starts or even before the mobile device detects a radio signal from the neighboring network. Such pre-handoff processing allows, among other things, fast-moving vehicles to roam seamlessly across homogeneous and heterogeneous radio systems.

As described below, the preferred embodiments of the present invention provide a mobile peer-to-peer information sharing (hereinafter referred to with the acronym MP2P-IS) method in which mobile users and devices collect information about each network they visit during their routine use of the network. Rather than forgetting the information after leaving the network, a mobile device carries the information with it as it moves into other networks. In the preferred embodiments, MP2P-IS takes advantage of a users' natural mobility to bring information collected by user devices to locations where that information can be useful to, and easily accessible by, other users and devices. The mobile users and devices then share directly with each other the information they need.

Thus, according to some of the preferred embodiments, a novel mobile peer-to-peer information sharing method is employed that addresses the real-time information discovery needs of mobile users and their devices. In some preferred embodiments, MP2P-IS has at least some, preferably all, of the following characteristics:

The ability to discover and share information about neighboring networks, in a highly timely manner;

The use of application-centric approaches that allow mobiles to discover information they want, rather than merely what network providers think they may need;

The ability to discover dynamically changing information;

The existence of no or virtually no dependency on local networks, except for transporting user packets; and/or The support of heterogeneous radio systems (such as, e.g., those which may belong to competing network providers who may not be motivated or may not have established the necessary agreements to share network information with each other).

DETAILED DISCUSSION

In some preferred embodiments, neighborhood discovery is used as an example to describe MP2P-IS. In some illustrative embodiments, mobile users may include pedestrians (such as, e.g., carrying mobile devices or the like) or people in moving vehicles (such as, e.g., being transported with mobile devices or the like). In various embodiments, mobile devices can involve in-vehicle networking devices, handheld devices, and/or any other now or later known or developed mobile devices.

In some preferred embodiments, MP2P-IS uses the following at least some, preferably all, of the following principles and basic methods that differ from other service discovery approaches or CARD.

First, in the preferred embodiments, mobile users and their devices collect device-interest and user-interest information regarding each network they visit as part of their routine use of the network.

Figure 2:
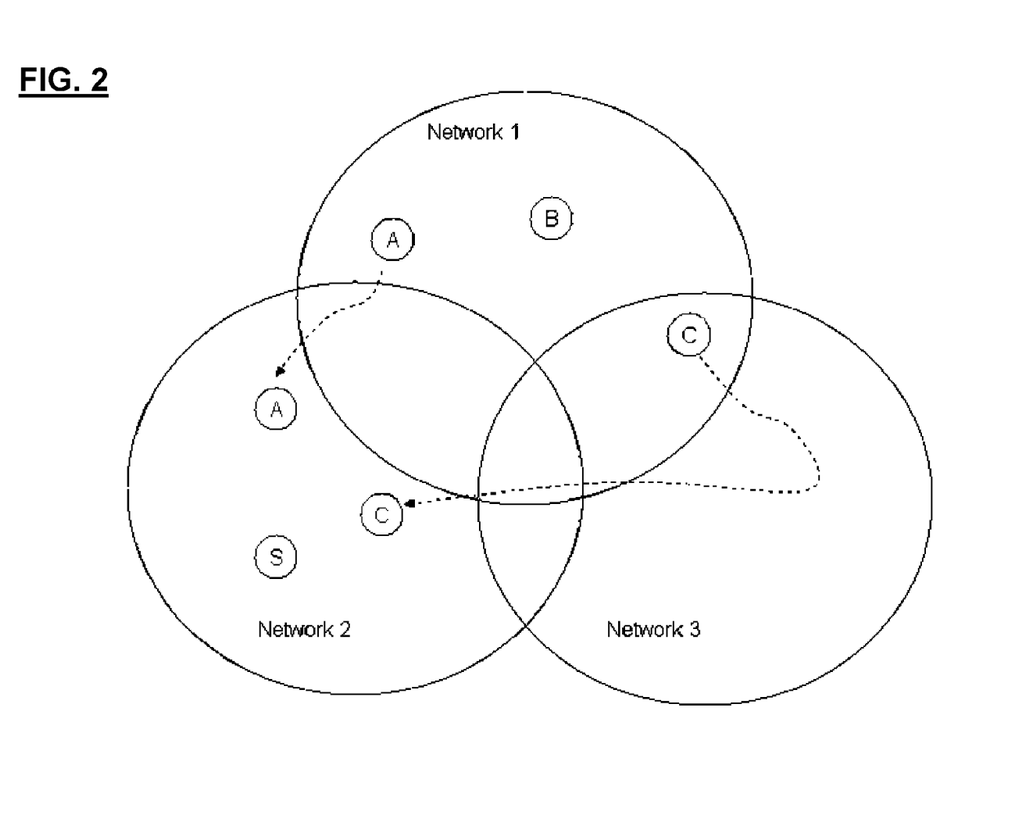
FIG. 2 is a schematic architectural diagram showing an illustrative scenario related to the collection of information and movement of mobile devices between networks according to some illustrative embodiments.

As shown in FIG. 2, for example, after using Network 1, a mobile A can learn a wide range of information regarding the network without any extra assistance from the network provider. Such information may include the type of the network (such as, e.g., IEEE 802.11a/b/g networks, IEEE 802.16 networks or the like), the addresses of the radio access points and the parameters needed to connect to them, the IP addresses of the IP access routers, the DHCP server, the authentication server, the authentication protocols supported, local content, and/or other network and user information the user and the user's device used in the network. In addition, the mobile may discover additional information regarding a visited network if the visited network supports service discovery capabilities and the mobile device implements the service discovery protocol required by the visited network.

In various embodiments, a mobile user or device can collect a broad range of information about the networks it detects and/or uses. For instance, in some embodiments, when a mobile device receives radio beacons from a wireless network, it can learn the existence of the network, the general location of the network, the type of the network, and/or capabilities of the network. Additionally, once a mobile device connects to a network successfully: a) the device can also know the addresses of the key network elements in the network, such as the addresses of the IP address servers and the authentication servers (e.g., if authentication is required); and b) a human user can also know the user information contents he finds or uses in the network. Additionally, mobile users and devices can also observe or detect dynamic events (such as, e.g., events depending on circumstances at a particular time, such as, for example, traffic conditions or other conditions, etc.) and can accumulate information contents related thereto.

In some instances, mobile users and devices themselves can operate as information creators. For example, a user may accumulate information in the user's mobile communication device about the points of interest or attraction that the user has visited, time-sensitive information about a point of interest or attraction the user is currently visiting (such as, e.g., current waiting times in traffic or at an establishment, etc.) and/or the like, and can make the information available to other users. By way of example, a mobile device could include, e.g., a user interface, such as a key board or the like, that a user can operate to enter text or alphanumeric data related to such information.

With reference to FIG. 2, in this illustrative example, after moving from Network 1 to Network 2, the mobile device also preferably knows that Networks 1 and 2 are neighboring networks. If the mobile receives radio signals from the two networks at the same time, it preferably further knows that the two networks have overlapping radio coverage areas.

In preferred embodiments, each mobile user and device does not have to know what information other mobiles need. Instead, in preferred embodiments, it simply collects the information that it needs for itself.

Second, in the preferred embodiments, rather than forgetting (e.g., deleting or discarding) the information regarding the network after the mobile device leaves the network, each MP2P-IS mobile device preferably carries the information with it (preferably, for a finite time period) as it moves into other networks. In preferred embodiments, MP2P-IS takes advantage of a users' natural mobility to bring the information collected by each user to locations where the information can be useful to, and easily accessible by, other mobiles.

In the illustrative example shown in FIG. 2, after the mobile A moves into Network 2, the information it collected about Network 1 can become useful to a mobile S which is in the Network 2 and which desires to know the information regarding its neighboring networks. It is noteworthy that the mobile S may not even know that there is even any neighboring network at all.

Notably, a single peer may potentially not have all of the information needed by a mobile. By way of example, the peer mobile A in FIG. 2 may potentially only know about Network 1 and may potentially not know anything about other neighboring networks of mobile S. However, in some circumstances, a proper set of peers may collectively know all the information that a mobile needs at the time that the mobile needs it. The determination of a proper set of peers is discussed below.

Third, in the preferred embodiments, mobiles share directly, in a peer-to-peer fashion, with each other the information they need. Preferably, this sharing is carried out in an on-demand manner. In this regard, by way of example with reference to FIG. 2, consider a mobile device that learns the IP address of an authentication server in Network 1 and the parameters needed by a mobile to authenticate with Network 1 (such as, e.g., security protocol used in Network 1), from the radio signals it has received from Network 1 or as a result of connecting to the network. The mobile device will carry the information with it when it moves into a neighboring Network 2, where it can share that information with other mobiles who wish to know the information.

Next, we consider how a mobile, such as, e.g., a mobile S shown in FIG. 2, discovers information about neighboring networks from peer mobiles. To discover information, the mobile S preferably queries a set of peers. In this disclosure, we refer to the set of peers that mobile S queries first and directly each time it initiates information discovery as mobile's "First Contact Peers."

Here, there are a few fundamental considerations that we now address:

1. First, we consider how a mobile can determine the set of first contact peers in a way that allows the mobile to get the information it needs quickly.

2. Second, we consider how to extend the search scope when the first contact peers cannot provide the requested information.

Addressing these considerations is more difficult in mobile networks than in peer-to-peer file sharing over the Internet due to, e.g., the following:

Information discovery by mobiles often needs to be done in a very time sensitive manner.

The set of peers that has the information needed by a mobile can change rapidly and dynamically. For example, with reference to FIG. 2, as a mobile S moves from the Network 1 to the Network 2, the peers that mobile S used in Network 1 to get information regarding Network 1's neighboring networks may not know anything about Network 2's neighboring networks. In particular, the set of peers that has the information needed by a mobile may depend on the locations of the mobile and the peers, and how long each peer keeps the information it learns about a network. Therefore, in some preferred embodiments, a mobile selects its first contact peers based on its current location and updates the list dynamically as the mobile moves about.

It is difficult for a mobile to locate and reach peers outside its current local IP subnet. This is because:

It is difficult to know the IP addresses (or other forms of contact address) of the peers outside the mobile's local IP subnet.

It is often difficult to use broadcasting to reach even the peers in a neighboring network. First, two neighboring radio networks can be an arbitrary IP hop count away from each other, making it difficult for the mobile to control its IP broadcast scope to reach a neighboring network. Second, a network often does not accept broadcast packets from a different network; this is especially the case when the two networks belong to different network providers. Besides, flooding even only the neighboring networks is not an attractive approach because it would be too costly and too time-consuming. Third, a mobile may not even know whether there is any neighboring network when it wishes to discover its neighboring networks.

It is difficult for a mobile to track the peers that it got to know in the past. Notably, a peer's IP address can change when it moves from one network to another network. In addition, different peers may use different mobility management protocols. Furthermore, some peers may not even have any IP-layer or higher-layer mobility support, making it difficult for a mobile to track the peers as they move from network to network.

According to the preferred embodiments, the following approach is advantageously employed for a mobile to dynamically establish and update a list of its contact peers to discover information from regarding neighboring networks.

First, a mobile's default set of first contact peers are preferably the peers that are in the mobile's current visited IP sub-network. In such a case, a mobile can preferably reach its default peers by, e.g., broadcasting a query message within the local IP sub-network without having to know the identities and/or addresses of such default peers.

Second, if the default first contact peers do not provide all the requested information, the search scope is preferably extended. To extend the search scope, a mobile preferably maintains a set or list of "Extended Peers." Preferably, this set of extended peers is in addition to its first contact peers. IN some instances, an extended peer can be outside the mobile's current IP subnet, in which case the mobile should know an extended peer's contact address, such as, e.g., its unicast IP address (or other forms of contact address such as a SIP URI), so that it can contact the extended peer via a standard IP unicast or the like.

Figure 3:
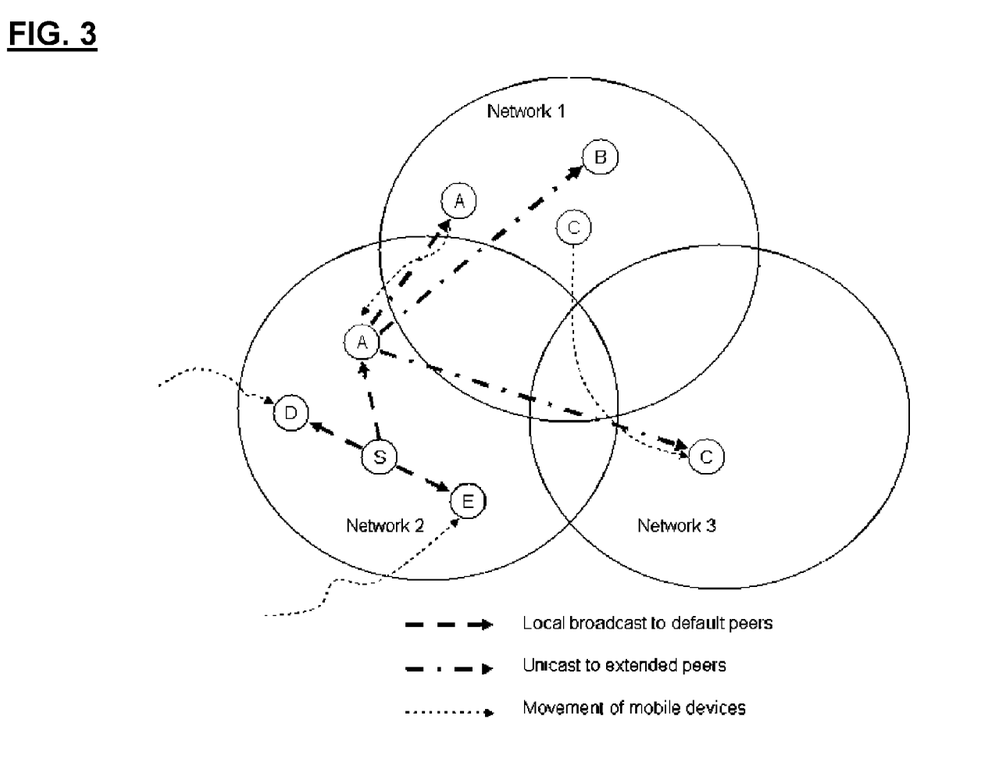
FIG. 3 is a schematic architectural diagram showing an illustrative scenario related to the use of extended peers according to some illustrative embodiments.

In some embodiments, extended peers are selected by using all of the peers that the mobile got to know in a previous network. For example, in the illustrative example shown in FIG. 3, the mobile A remembers the first contact peers it used in Network 1 when it moves into Network 2, where these peers will become mobile A's "Extended peers." As a result, while in Network 2, mobile A may potentially contact these extended peers. Notably, these extended peers may have also moved out of the Network 1 into other networks. As a result, these extended peers may be able to provide the information that the mobile A wants. For instance, in the example shown in FIG. 3, the mobile C will now be able to tell mobile A that Network 3 is a neighboring network of Network 1.

As indicated above, in some instances, an extended peer may have changed its IP address since the time the requesting mobile last contacted it. This means that the requesting mobile may not always be able to reach all of its extended peers. However, it is not necessary to reach all of the peers, but rather to reach a sufficient number of such peers. That is, the goal is preferably not to reach all the extended peers, but to reach enough peers so that the peers it reaches will collectively have the information needed by the requesting mobile with a satisfactorily high probability.

In the preferred embodiments, a mobile maintains each extended peer for a finite lifetime. In some examples, a mobile may remove an extended peer from its set or list a) if the extended peer has not been used for a certain time period and/or b) if the mobile has moved far away from where it first got to know the extended peer (such as, e.g., based on physical location, such as, e.g., determined by global positioning systems and/or other means, based on numbers of networks, and/or the like). By way of example, if the mobile A in FIG. 3 maintains each extended peer as long as the mobile is not more than two networks away from the network in which the mobile got to know the extended peer, then it will still remember its extended peer (e.g., mobile C) that it got to know in Network 1 and, thus, it can ask mobile C for information about its current neighboring networks.

Third, in some preferred embodiments, before a mobile seeks to know the information about its neighboring networks, it can determine whether querying its first contact peers alone should allow it to get the information it needs with a high enough probability. In some preferred embodiments, methods described below can be employed. In this regard, one illustrative way to make such a determination is to use a predictive model based on the mobile's experience of getting the information it needs from its first contact peers alone in the previous networks. In some embodiments, the mobile can record whether it has obtained sufficient information from its first contact peers alone in the previous networks, then it may use a statistical model to predict whether it will likely obtain the information it needs again from only its first contact peers.

If the mobile determines that its first contact peers alone will not likely provide all the requested information, in some embodiments, it may send the initial query to its extended peers and to its first contact peers at the same time. In addition, based on such a determination or under other circumstances, the mobile can also send an instruction to its first peers to extend the search. For example, the mobile can use a Time-To-Live (TTL) field in the initial query message to instruct the first peers that they should extend the search to their respective peers (e.g., to their default and/or extended peers). That is, depending on circumstances, the mobile does not have to wait until it receives responses from its first contact peers before it starts contacting the extended peers, such that query delays are reduced.

Fourth, in some preferred embodiments, upon receiving a query, a peer returns the requested information to the request originator if the peer has the requested information. In some embodiments, the peer then determines whether it should further forward the query to its own default peers and/or extended peers based on the value of the TTL field in the received query message. In some preferred embodiments, each time a peer forwards a query message, it decrements the TTL field in the message. In such cases, a peer receiving the request message with, e.g., a zero TTL will not forward the message any further.

Preferably, in order to ensure that peers can discover and exchange information, each mobile describes the information items in a standard and extensible manner. In some illustrative embodiments, MP2P-IS can employ the Resource Description Framework (RDF).

In addition, the protocol used for mobiles to communicate with each other to discover and share information is preferably a standard protocol so that mobile devices manufactured by different equipment makers can share information with each other. It is also preferably lightweight. That is, it should, e.g., have low time complexity (i.e., should not create excessive delay), low power consumption if it is implemented on power-constrained mobile devices, and/or low software complexity to reduce cost, such as when it is to be implemented on small devices. In some illustrative embodiments, MP2P-IS can employ the Simple Object Access Protocol (SOAP) (see, e.g., reference [8] above).

Analytical Models

As discussed above, in some cases, a mobile may operate (such as, e.g., be programmed or otherwise configured) so as to carryout a determination of whether to contact certain peers, such as, e.g., using a predictive model.

In this regard, an important question for consideration is: how likely will a mobile be able to get the information it needs from its first contact peers alone? This is an important question because, among other things:

First, when a mobile's first contact peers have the requested information, the latency of information discovery is minimized. In addition, the network resources consumed for information discovery is also reduced.

Second, the answers will provide guidance to determine how many first contact peers a mobile needs to have so that it can get the information it wants without having to extend its search scope beyond its first contact peers.

Third, when a mobile's first contact peers are peers inside the mobile's current IP subnet, answers to the above question helps determine how many peers need to be in an IP subnet for a mobile to be able to get the information it needs simply by querying only the peers inside the mobile's current IP subnet. Querying peers inside the current IP subnet is much easier than querying other peers because the mobile does not have to maintain the IP addresses of the peers inside the current IP network.

In the following paragraphs, an exemplary preferred analytical model is described and analysis results are provided that help to answer the following question: how many peers have to be inside a network so that they collectively have information about all neighboring networks?

Consider a mobile $M_1$ in a Network $N_1$, wherein the mobile desires to know the information regarding all of its neighboring networks. Here, we consider the case of inquiring about all neighboring networks because a mobile may not know whether there is a neighboring network and may not be sure which specific neighboring network it will move into next.

Here, let $N=\{N_1, N_2, N_3, \ldots N_n\}$ be the set of the neighboring networks plus Network $N_1$. Let $M=\{M_1, M_2, M_3, \ldots, M_k\}$ be the set of mobiles in Network $N_1$ at the time mobile $M_1$ wishes to know about $N_1$'s neighboring networks. Assume that each mobile $M_i$ (i=1, ... k) came into Network $N_1$ from each network $N_j$ (j=1, ..., n) with uniformly equal probability. Thus, we ask the question: how large will k need to be for the k mobiles in network $N_1$ to collectively have the information regarding all the neighboring networks?

Here, the problem of determining the value of k can be considered as becoming the "Coupon Collector's Problem." See reference [9] above. The Coupon Collector's Problem can be formulated as follows: how many balls k do we have to throw in n bins before each bin contains at least one ball? In such an example, the n bins correspond to the number of networks (i.e., n networks) and the k balls correspond to the number of mobiles (i.e., k mobiles) in Network $N_1$ needed to collectively have the information regarding all the n−1 neighboring networks of Network $N_1$.

Let S(j) be the average number of mobiles (including the requesting mobile) in a network $N_1$ before the mobiles collectively have the information regarding j different networks. In an example, we will assume that the request originator (i.e., mobile $M_1$) does not have knowledge regarding any neighboring network when it sends out its query. We assume that it only knows about $N_1$. Therefore, S(1)=1.

Given that the mobiles in Network $N_1$ have already had information regarding j distinct networks, we denote by M(j) as the average number of additional mobiles that are needed to be in network $N_1$ so that the mobiles in Network $N_1$ will know about a new neighboring network. Then, S(n) can be expressed as:

$$S(n) = S(n-1) + M(n-1)$$
$$S(n-1) = S(n-2) + M(n-2)$$
$$\vdots$$
$$S(2) = S(1) + M(1)$$
$$S(1) = 1$$

Now, suppose that the current mobiles in network $N_1$ have information about n−1 distinct networks. Then, the probability that one additional mobile in network $N_1$ will bring information about a new neighboring network will be 1/n. The probability that only the second additional mobile in network $N_1$ will bring the information about a new neighboring network can be expressed as ((n−1)/n)(1/n). The probability that only the third additional mobile in network $N_1$ will bring the information regarding a new neighboring network can be expressed as ((n−1)/n)((n−1)/n)(1/n), and so on. Therefore, M(n−1) can be calculated as follows:

$$M(n-1) = 1\frac{1}{n} + 2 \cdot \frac{n-1}{n} \cdot \frac{1}{n} + 3\left(\frac{n-1}{n}\right)^2 \frac{1}{n} + 4\left(\frac{n-1}{n}\right)^3 \frac{1}{n} + \cdots$$
$$= \frac{1}{n}\left\{1 + 2\left(\frac{n-1}{n}\right) + 3\left(\frac{n-1}{n}\right)^2 + 4\left(\frac{n-1}{n}\right)^3 + 5\left(\frac{n-1}{n}\right)^4 + \cdots\right\}$$
$$= \frac{1}{n}n^2 = n$$

Similarly, we can derive that:

$$M(k) = 1\frac{n-k}{n} + 2\left(\frac{k}{n}\right)\left(\frac{n-k}{n}\right) + 3\left(\frac{k}{n}\right)^2\left(\frac{n-k}{n}\right) + 4\left(\frac{k}{n}\right)^3\left(\frac{n-k}{n}\right) + \cdots$$
$$= \left(\frac{n-k}{n}\right)\left\{1 + 2\left(\frac{k}{n}\right) + 3\left(\frac{k}{n}\right)^2 + 4\left(\frac{k}{n}\right)^3 + \cdots\right\}$$
$$= \frac{n}{n-k}$$

Therefore, we have:

$$S(n) = 1 + \frac{n}{n-1} + \frac{n}{n-2} + \frac{n}{n-3} + \frac{n}{n-4} + \cdots + n$$

$$= n\left(1 + \frac{1}{2} + \frac{1}{3} + \cdots + \frac{1}{n-1} + \frac{1}{n}\right)$$

$$\cong n \lg(n)$$

Figure 4:
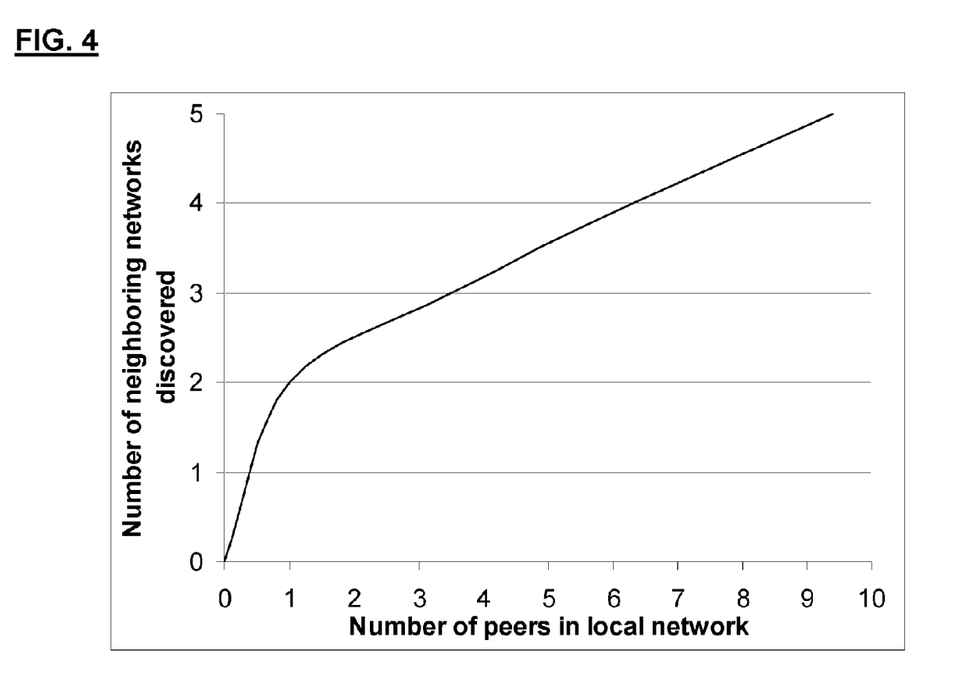
FIG. 4 is a graphical diagram depicting rate of change in number of neighboring networks discovered verses the number of mobiles in the local area network according to some illustrative and non-limiting analytical models.

Based on this model, FIG. 4 is a graph that shows neighboring networks discovered verses the number of mobiles in the local network. FIG. 4 demonstrates the number of neighboring networks a mobile will be able to discover by broadcasting a query to only the local network as a function of the number of mobiles currently in the local network. It can be observed from FIG. 4 that it takes only a small number of peers in the local network to provide the information regarding all of the neighboring networks. This suggests that the present MP2P-IS approach, even in its simplest form, in which a mobile queries only peers in its local network area (e.g., IP subnet), should perform well in sparsely populated networks and/or in networks that have small coverage areas.

The preferred embodiments provide a new peer-to-peer approach for mobile users and their mobile devices to discover and share, in real time, e.g., network information regarding and/or user content in neighboring networks. The foregoing analysis results reveal that a mobile will often be able to find the information it needs simply by broadcasting a query to the peers in its local IP subnet, even when there is only a small number of peers in the local IP subnet.

In some illustrative embodiments, where, as discussed above, a mobile operates so as to carry out a determination of whether to contact extended peers, the determination can include a determination of the number of peers in the current network, such that based on the foregoing, the mobile will be able to predict if additional peers may be necessary. In some preferred embodiments, based on the foregoing analytical model, the mobile communications to extended peers and from such extended peers can be minimized as the number of peers required to have all necessary information is often a small number.

BROAD SCOPE OF THE INVENTION

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims (e.g., including that to be later added) are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology is employed: "e.g." which means "for example."

What is claimed is:

1. A method for mobile peer-to-peer information sharing, comprising:
    a) having a plurality of mobile devices each collect information regarding a plurality of networks that each of said mobile devices uses;
    b) having each of said mobile devices maintain said information even after it leaves a network for which such information is collected;
    c) transmitting a request for neighboring-network information regarding neighboring networks from a first of said plurality of mobile devices to a set of first contact peers of said plurality of mobile devices;
    d) determining if said set of first contact peers is sufficient for obtaining said neighboring-network information regarding neighboring networks;
    e) if a determination is that said set of first contact peers are insufficient, transmitting a request for neighboring-network information regarding neighboring networks from said first of said plurality of mobile devices to a set of extended peers of said plurality of mobile devices;
    f) further including having said information regarding a plurality of networks in (a) includes information regarding points of attachment to said plurality of networks;
    g) further including having said information regarding points of attachment to said plurality of networks including information regarding access points to said networks; and
    h) further including having said information regarding access points to said networks include information needed to acquire a local IP address from and authenticate with the network, and wherein said access points to said networks include access points to I.E.E.E. 802 networks.

2. The method of claim 1, wherein said information regarding networks that the mobile devices used includes device-interest information.

3. The method of claim 1, wherein said information regarding networks that the mobile devices used includes user-interest information.

4. The method of claim 1, wherein said information regarding networks that the mobile devices used includes both device-interest information and user-interest information.

5. The method of claim 2, wherein said device-interest information includes information used by the mobile devices to access a network.

6. The method of claim 5, wherein said device-interest information includes at least one IP address of an IP address server or an authentication server.

7. The method of claim 3, wherein said user-interest information includes the location of local networks, network services or networked devices.

8. The method of claim 3, wherein said user-interest information includes applications and software utilities.

9. The method of claim 3, wherein said user-interest information includes location-sensitive information or application contents.

10. The method of claim 3, wherein said user-interest information includes dynamically changing user-interest information.

11. The method of claim 1, further including having said set of first contact peers include peers that are in said first mobile device's current IP sub-network.

12. The method of claim 11, further including having said first mobile device broadcast a query message within said current IP sub-network without knowing the identities or addresses of at least some of said first contact peers.

13. The method of claim 1, further including having said plurality of mobile devices each maintain a list of extended peers.

14. The method of claim 13, further including having said first mobile device transmit messages to said extended peers' contact addresses.

15. The method of claim 14, further including having said first mobile device transmit unicast messages to said extended peers' unicast IP addresses.

16. The method of claim 1, further including having said extended peers include peers that the mobile got to know in a previous network.

17. The method of claim 13, further including having said mobile devices retain each extended peer for a finite lifetime which is based on a time period or on a network location.

18. The method of claim 1, further including having said first mobile device send an initial query concurrently to both its set of first contact peers and its extended peers.

19. The method of claim 1, further including having said first mobile device include a time-to-live field in an initial query message, and having said first mobile device's peers extend the search to their own peers.

20. The method of claim 1, further including upon receiving a query from said first mobile device having a peer return at least some of said requested information if the peer has at least some of said requested information.

21. The method of claim 1, further including upon receiving a query from said first mobile device having a peer determine whether it should forward the query to its own peers based on a value of a time-to-live field.

22. The method of claim 1, wherein said determining includes evaluating how many peers are in an IP sub-network of the first of said mobile devices.

23. The method of claim 1, wherein said determining includes determining whether said set of first contact peers do not provide all of the requested information, and extending a search to said extended peers if said first contact peers do not provide all of the requested information.

24. The method of claim 1, wherein said I.E.E.E. 802 networks are wireless local area networks.

25. A method of network neighborhood discovery of neighboring-network and location-based information using mobile peer-to-peer information sharing, comprising:
a) having a plurality of mobiles each collect network and location-based information regarding a plurality of networks that each of said mobile devices uses;
b) having each of said mobiles maintain said information for a finite lifetime even after it leaves a network for which said information is collected;
c) having a first mobile of said plurality of mobiles transmit a request for neighboring-network information or location-based information to peer mobiles of said first mobile; and
d) having at least one of said peer mobiles transmit at least some of said requested information to said first mobile based on said information collected by said at least one of said peer mobiles;
e) further including having said information regarding a plurality of networks in (a) includes information regarding points of attachment to said plurality of networks;
f) further including having said information regarding points of attachment to said plurality of networks including information regarding access points to said networks;
g) further including having said information regarding access points to said networks include information needed to acquire a local IP address from and authenticate with the network, and wherein said access points to said networks include access points to I.E.E.E. 802 networks.

26. The method of claim 25, wherein said location-based information includes dynamically changing user content information available in neighboring networks or dynamic events that the mobile devices or their users can observe.

27. The method of claim 25, further including having said plurality of mobiles collect information in (a) based on that mobiles' access and use of such networks and retain that information for a finite time period and retain that information irrespective of the proximity of said network to the mobile device during that time period.

28. The method of claim 25, further including having said plurality of networks include a plurality of heterogeneous radio networks and having said first mobile in (b) and said at least one of said peer mobiles in (d) communicate by transmitting IP packets to one another using different radio access technologies.

29. The method of claim 25, wherein said I.E.E.E. 802 networks are wireless local area networks.

30. A method of network neighborhood discovery of neighboring-network and location-based information using mobile peer-to-peer information sharing, comprising:
a) having a plurality of mobiles each collect network and location-based information regarding a plurality of networks that each of said mobile devices uses;
b) having each of said mobiles maintain said information for a finite lifetime even after it leaves a network for which said information is collected;
c) having a first mobile of said plurality of mobiles transmit a request for neighboring-network information or location-based information to peer mobiles of said first mobile;
d) having at least one of said peer mobiles transmit at least some of said requested information to said first mobile based on said information collected by said at least one of said peer mobiles;
e) further including having said information regarding a plurality of networks in (a) includes information regarding points of attachment to said plurality of networks; and
f) further including having said information regarding points of attachment to said plurality of networks include a) type of network, b) addresses of access points, c) parameters needed to access access points and d) authentication information.

* * * * *